Jan. 2, 1945.    F. E. WEICK ET AL    2,366,164
BRAZING
Filed Feb. 17, 1943    2 Sheets-Sheet 1
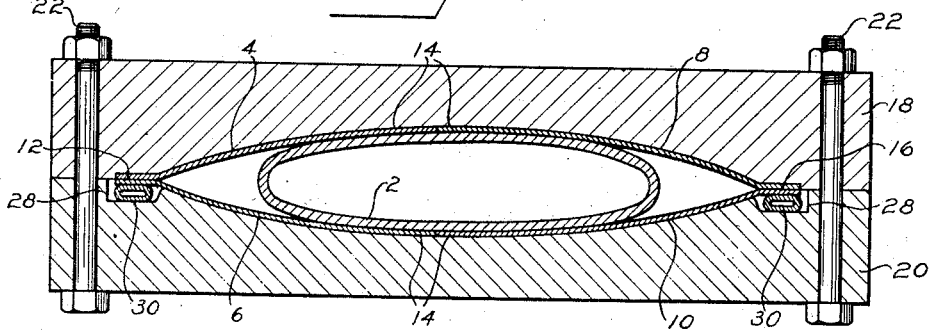
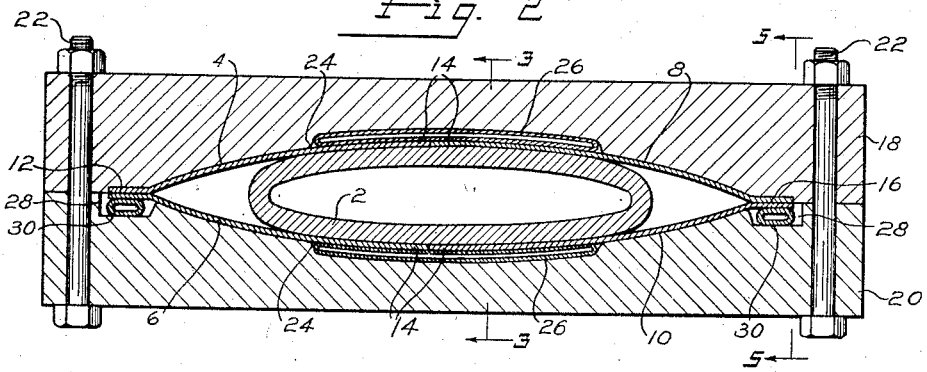
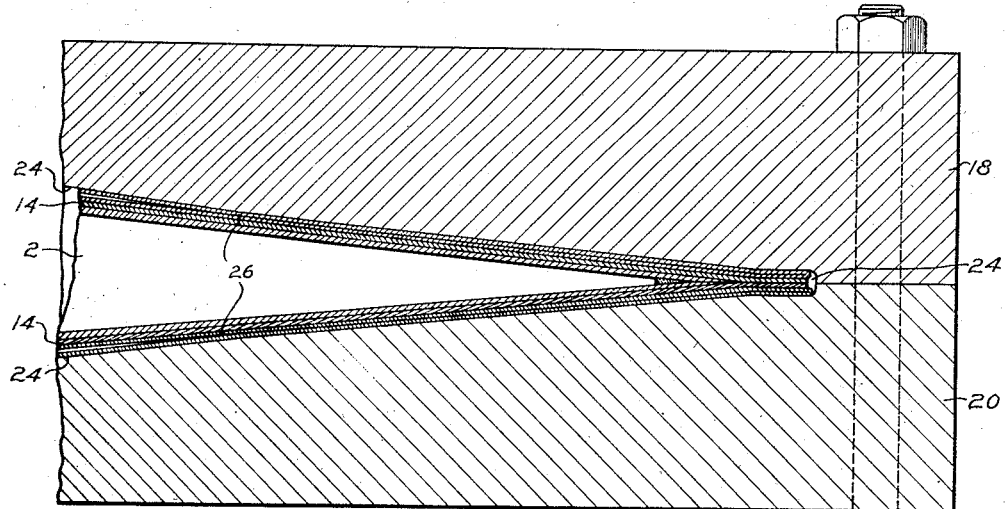
Inventors
FRED E. WEICK
CHRISTIAN DE BOER
By Samuel Scrivener Jr.
Attorney Jan. 2, 1945.  F. E. WEICK ET AL  2,366,164
BRAZING
Filed Feb. 17, 1943  2 Sheets-Sheet 2
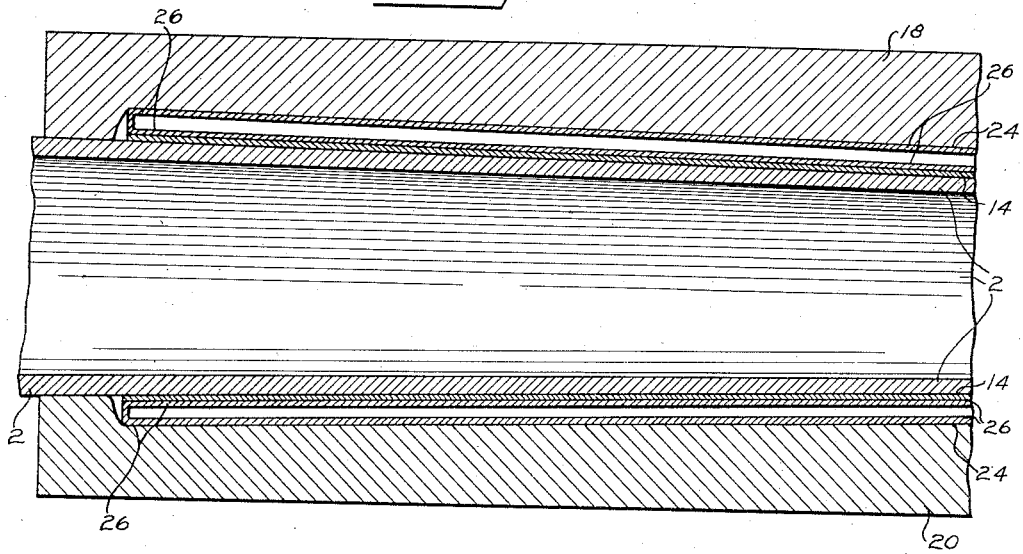
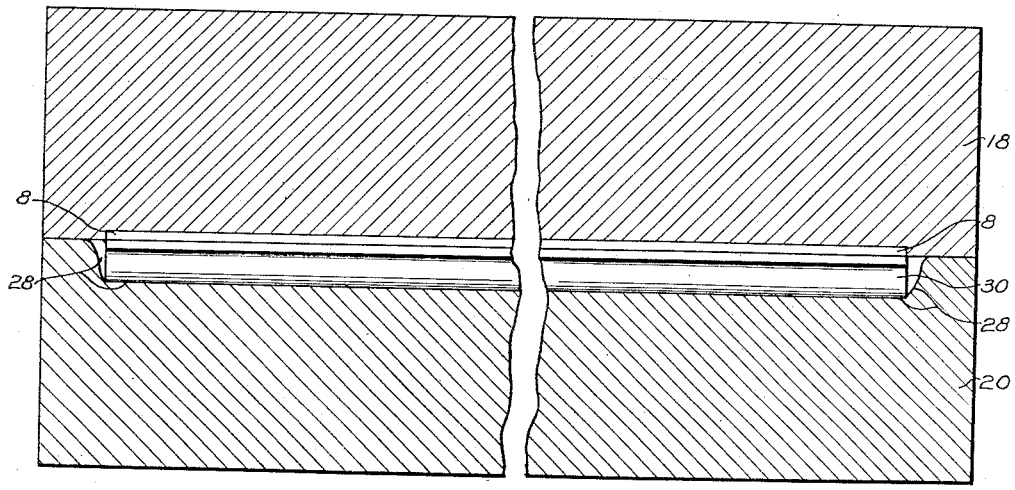
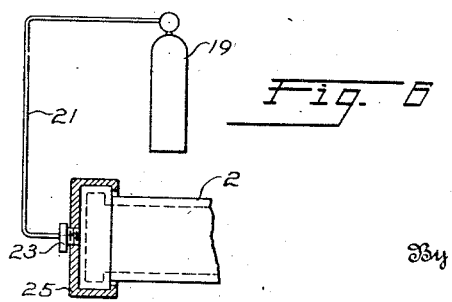
Inventor
FRED E. WEICK
CHRISTIAN DE BOER
By Samuel Scrivener Jr.
Attorney Patented Jan. 2, 1945

2,366,164

UNITED STATES PATENT OFFICE 2,366,164

BRAZING

Fred E. Weick, College Park, and Christian De Boer, Ashton, Md., assignors to Engineering and Research Corporation, Riverdale, Md., a corporation of Maryland Application February 17, 1943, Serial No. 476,224

6 Claims. (Cl. 113—112)

This invention relates to the art of uniting metal parts by brazing and is particularly concerned with providing an improved method and apparatus for pressing such parts together to give uniform contact during the brazing operation. A principal feature of the invention is the provision of a method and apparatus for utilizing the brazing heat to produce a pressure of the parts toward each other.

In this application the invention will be described as applied to the manufacture of metal propeller blades of the type comprising a number of parts which are united by brazing, and in which the production of unions of great strength and uniformity is important, but it will be understood that the invention is of general utility in the art of uniting metal parts by brazing.

Other objects than that set forth hereinbefore will be made apparent by the following description and the annexed drawings which will be understood to be only illustrative of the invention.

In the drawings, in which the same reference numerals refer to like parts,

Fig. 1 is a cross-sectional view of a jig or fixture having therein parts which are to be brazed together to form a propeller blade and also being formed to have and having therein means for carrying out this invention;

Fig. 2 is a view similar to Fig. 1 but showing preferred means for carrying out a preferred method according to the invention;

Figs. 3 and 4 are enlarged longitudinal sectional views taken on the line 3—3 of Fig. 2 at the tip end and root end of the blade, respectively;

Fig. 5 is an enlarged longitudinal sectional view taken on the line 5—5 of Fig. 2, and Fig. 6 is a diagrammatic view showing a means for introducing fluid pressure into a part of the apparatus.

This invention may be broadly considered as providing a new method of, and means for, connecting metal parts by brazing. Such parts may, for the purpose of describing the invention, be considered to be those which must be united to form a propeller blade of the type having a reinforcing tube 2, which extends longitudinally of the blade, and fairing members 4, 6, 8, 10 which are united to the outer surface of the tube 2 and extend beyond the edges thereof to give the blade its rquired air-foil cross-section. The fairing members 4, 8 which are connected to the upper side of the tube abut along the approximate center-line of the tube and the fairing members 6, 10, which are connected to the lower side of the tube likewise abut along the longitudinal center-line of the tube, all of these fairing members being united to the tube by brazing throughout the entire areas 14 over which they are in face-to-face contact with the tube. The outer longitudinal edges of the fairing members 4, 6 are brought together in face-to-face contact, as at 12, to be united by brazing to form, for example, the leading edge of the blade, while the outer longitudinal edges of the fairing members 8, 10 are similarly brought together and united, as at 16, to form the trailing edge of the blade.

In the manufacture of a blade such as that described, as well as in the manufacture of metal blades of other types and in the general art of uniting metal parts by brazing, it is important that a strong union be made and that it be uniform throughout the united areas, such as at 14. In order to effect this in accordance with the invention the parts are placed in a jig or fixture having an upper part 18 and a lower part 20, which may be releasably held together by bolts 22. Each of these parts has an interior, longitudinally extending cavity therein having the same shape as the upper or lower face of a propeller blade. The parts are assembled in the respective cavities in the manner shown and the parts of the jig or fixture attached together by the bolts 22, brazing material being placed between the tube and the fairing members throughout the areas 14 and between the abutting edge portions at 12 and 16.

In order to make a strong and uniform union between the tube 2 and the fairing members throughout the entire areas of contact therebetween, the ends of the tube 2 are sealed and an inert gas under pressure is introduced into the tube, the pressure of the gas being regulated to cause the walls of the tube to be forced toward the fairing members and the abutting parts of the jig, thus placing the areas of contact and the brazing material under a uniform pressure. The required pressure is maintained within the tube 2 until the brazing operation is completed. The gas may be introduced into tube 2 in any desired manner such as, for example, by the flask 19 and pipe 21 which are connected to the interior of the tube through a fitting 23 in a removable cover 25 connected to and closing the tube at the hub end thereof.

In a preferred method according to the invention, inert gas at a low pressure which is insufficient to force the tube into tight contact with the fairing members, is introduced into the tube 2 after which the tube is completely sealed. The brazing heat causes the tube material to become less rigid and at the same time causes the gas within the tube to expand, thus forcing the walls of the tube outwardly into tight and uniform engagement with the fairing members, movement of which is prevented by the parts of the jig or fixture. It has been found in one case that an initial pressure of 20 pounds per square inch and a final pressure of 40 pounds per square inch within the main reinforcing tube provided good results.

The thickness of the wall of the tube 2 will, of course, determine the effect of the pressure within the tube in forcing the tube into contact with the fairing members and, if such thickness is too great, readily available pressures will not have the required effect. Accordingly, in an alternative procedure according to the invention pressure is applied externally of the fairing members tending to force them into contact with the walls of the tube 2 which, in this case, act as the fixed abutment. In putting this method into practice there is formed in each of the fixture parts 18, 20 a shallow cavity or depression 24 which extends longitudinally and centrally of the principal cavity in each fixture part and which is of sufficient width to cover the brazing areas 14, all as shown in Figs. 2, 3 and 4 of the drawings. Within each of these cavities and therefore between each fairing member and the adjacent fixture member, there is placed an elongated, flat tube or bladder 26 which is preferably formed of flexible sheet metal, such as copper or steel. During the brazing operation each of these bladders is filled with gas under pressure, thereby causing the same to tend to assume a condition of circular cross-section which is prevented by the adjacent fixture part and the wall of the tube 2. The fairing members will therefore be uniformly pressed toward the tube throughout the entire brazing areas 14 during, preferably, the entire brazing operation. Gas under pressure may, if desired, be valved into the bladders 26 during the brazing operation but in the preferred practice of the invention the bladders are filled with gas at a suitable low pressure, after which the bladders are sealed and placed in position, the brazing heat causing the trapped gas to expand to produce the described effects. It has been found in one case that an initial pressure of 15 pounds per square inch and a final pressure of 20 pounds per square inch within the bladders provided good results.

It is a known practice to taper the walls of the reinforcing tube of a blade of the described type, whereby such wall is thicker at the hub end of the blade than at the tip end. In applying the methods described hereinbefore to the manufacture of a blade having such a tube external pressure, as provided by the bladders 26, is utilized at the thick-walled end of the tube, and internal pressure, as provided by compressed gas within the tube 2, is utilized at the thin-walled end of the tube for the purpose of achieving the desired uniform and strong union between the parts. The means according to the invention for effecting this are particularly disclosed in Figs. 3 and 4 and it will be seen that the cavities 24 are caused to progressively decrease in depth along their length, being of greatest depth at the thick-walled end of the tube and at the thin-walled end of the tube being only deep enough to receive the two walls of the bladder disposed therein. Gas under pressure is introduced into both of the bladders 26 and into the tube 2, any of the procedures hereinbefore described being utilized to cause increase of pressure of such gas. It will be seen that at the thick-walled end of the tube pressure within the tube 2 may have negligible effect, but that the bladders at such end will force the fairing members into contact with the tube. At the thin-walled end of the tube the cavities 24 are so shallow that no expansion of the bladders is permitted, but pressure within the central tube, which is substantially greater than the pressure in the bladders forces the walls thereof into engagement with the fairing members, the fixture parts 18, 20 and the abutting bladder walls forming a fixed abutment against which such pressure is exerted. The effect of inwardly-acting and outwardly-acting pressure between the tube and fairing members at any point along the length of the blade is determined by the thickness of the wall of the tube 2 and varies throughout the length of the blade and a pressure will therefore be exerted throughout the entire area of contact between the tube and the fairing members.

The method and means according to this invention are also applied to the formation of a strong and uniform union between the parts forming the leading and trailing edge portions of the fairing members. The inner surfaces of the longitudinal edge portions of the fairing members 4, 6 and of fairing members 8, 10 are brought into proper face-to-face abutting relation by bringing together the two parts of the jig or fixture, as shown in Figs. 1 and 2 of the drawings. In one of these parts, for example the lower part as shown in the drawings, two elongated cavities or grooves 28 are formed which respectively underlie the leading and trailing edge portions of the fairing members 6, 10 and which are transversely wider than the areas of the fairing members which are to be united to the fairing members 4, 8. An elongated, flexible metallic tube 30 is placed in each cavity 28, each such tube preferably extending throughout the entire length of the union between the edges of the fairing member. Each tube may be inflated by connection to a source of gas under pressure but preferably each is filled with gas at a suitable low pressure and is then sealed at both ends, the brazing heat being utilized to cause expansion of the gas and the consequent tendency of the flexible tube to achieve a circular cross-section, resulting in uniform pressure of one fairing member edge toward that to which it is to be joined. It has been found in one case that an initial pressure of approximately 50 pounds per square inch and a final pressure of approximately 100 pounds per square inch in the tubes 30 produced good results.

Obviously, air, a non-inert gas or a liquid might be used in place of the inert gas referred to herein and the term fluid, as used in the specification and claims, is to be understood to be generic to all of these. Also, tubes and bladders of other materials than those referred to may be used.

While various steps and procedures and means according to the invention have been described and illustrated, it will be apparent to those skilled in the art that one or more of these may be eliminated or modified or their order changed and that other embodiments may be made, all without departing in any way from the spirit or scope of the invention, for the limits of which reference must be had to the appended claims.

What is claimed is:

1. In the art of uniting metal parts by brazing, the improvement which consists in placing the parts in a jig or fixture with brazing material between them and with a sealed, gas-filled tube in face-to-face contact with one of them, and applying heat to simultaneously effect the brazing operation and expand the gas in the tube to thereby cause the parts to be pressed together.

2. In the manufacture of metal propeller blades of the type comprising an interior tube and exterior fairing members which are placed in a jig or fixture and united over their abutting areas by brazing, the improvement which consists in introducing a pre-determined volume of gas into the interior tube, sealing the tube, applying brazing material between the tube and fairing members, and applying heat to simultaneously effect the brazing operation and expand the gas within the tube to cause the walls of the tube to be pressed against the fairing members and the surrounding jig or fixture during the brazing operation.

3. In the manufacture of metal propeller blades of the type comprising an interior tube and exterior fairing members, the improvement which consists in placing the members in a jig or fixture with a sealed gas-filled tube in face-to-face contact with the outer surface of at least one of the fairing members at the brazing area, introducing gas under pressure into the interior tube, sealing the interior tube, and heating to simultaneously effect the brazing operation and expand the gas in the interior tube and the outer tube to thereby cause the parts to be pressed together.

4. In the manufacture of metal propeller blades of the type comprising at least two metal members which are united by brazing their edge portions together, the improvement which consists in bringing the edge portions of the members into face-to-face contact with brazing material between them, placing the members in a jig or fixture with a sealed, flexible, gas-filled tube in face-to-face contact with the outer face of one of said edge portions, and heating to simultaneously effect the brazing operation and expand the gas in the tube to cause the same to exert a pressure along the edges of the members to press the same together and against the jig or fixture.

5. In the manufacture of metal propeller blades of the type comprising an interior tube and exterior fairing members which are to be united to the tube over their abutting areas by brazing, the method of connecting such parts which comprises assembling the fairing members with their marginal portions in contact and with faces of said members contacting opposite sides of said tube, supporting said members against outward movement, introducing fluid under pressure within the tube, and heating the assembly to simultaneously effect the brazing of said fairing members to said tube and the expanding of the fluid to thereby cause the parts to be pressed firmly together during the brazing.

6. In the art of uniting metal parts by brazing, the improvement which consists in bringing the parts into face-to-face contact with brazing material between them, contacting the outer surface of one part with a substantially flexible hollow body filled with fluid, rigidly supporting the outer face of the other part, and heating the assembly to effect brazing of said parts and expansion of the fluid to cause said body to press the parts firmly together and against the support during brazing.

FRED E. WEICK.
CHRISTIAN DE BOER.